(12) United States Patent
Cun et al.

(10) Patent No.: US 9,022,080 B2
(45) Date of Patent: May 5, 2015

(54) COMMUNICATION DEVICE ACTIVATED BY FUEL DOOR

(75) Inventors: David W. Cun, Garden Grove, CA (US); Ryan Douglas Roy Harty, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 613 days.

(21) Appl. No.: 13/368,657

(22) Filed: Feb. 8, 2012

(65) Prior Publication Data

US 2013/0199660 A1     Aug. 8, 2013

(51) Int. Cl.
*B65B 1/30* (2006.01)
*B60L 11/18* (2006.01)

(52) U.S. Cl.
CPC .......... *B60L 11/1838* (2013.01); *B60L 11/1883* (2013.01); *B60L 11/1887* (2013.01); *B60L 11/1888* (2013.01); *B60L 11/1898* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/34* (2013.01)

(58) Field of Classification Search
CPC ........................................................ B65B 3/04
USPC ............ 141/2, 83, 94, 95, 192, 198; 340/438, 340/449
See application file for complete search history.

(56) References Cited

U.S. PATENT DOCUMENTS

| | | | |
|---|---|---|---|
| 4,817,576 A | 4/1989 | Abe et al. | |
| 5,819,796 A * | 10/1998 | Kunimitsu et al. | 137/587 |
| 6,446,049 B1 * | 9/2002 | Janning et al. | 705/40 |
| 6,533,002 B1 * | 3/2003 | Kobayashi et al. | 141/302 |
| 6,672,340 B2 * | 1/2004 | Mutter | 141/4 |
| 6,834,688 B2 * | 12/2004 | Ono et al. | 141/94 |
| 7,363,803 B2 | 4/2008 | Hayakawa et al. | |
| 7,477,136 B2 * | 1/2009 | Konno et al. | 340/426.28 |
| 7,671,482 B2 | 3/2010 | Tighe | |
| 7,861,748 B2 * | 1/2011 | Iida | 141/95 |
| 7,896,036 B2 * | 3/2011 | Kobayashi et al. | 141/94 |
| 8,122,918 B2 * | 2/2012 | Handa | 141/95 |
| 8,522,834 B2 * | 9/2013 | Okawachi | 141/95 |
| 8,684,044 B2 * | 4/2014 | Saiki et al. | 141/4 |
| 8,720,500 B2 * | 5/2014 | Maier | 141/192 |
| 2008/0202624 A1 | 8/2008 | Hajiaghajani | |

* cited by examiner

*Primary Examiner* — Timothy L Maust
(74) *Attorney, Agent, or Firm* — Fay Sharpe LLP

(57) ABSTRACT

A communication device or auxiliary ECU is activated when a fuel door of a fuel cell vehicle is open. Upon closing the fuel door, the communication device/ECU is shut off. The communication device/auxiliary ECU is operational regardless of whether the keys in the vehicle or not. This assures that communication of information can occur when a refueling station is most likely to request the information, i.e. when the fuel door is open. A temperature measurement device may monitor a vehicle tank temperature, communicate the tank temperature data to a filling station, and confirm that the tank temperature data is associated with the tank being filled.

18 Claims, 4 Drawing Sheets

_(54)_ COMMUNICATION DEVICE ACTIVATED BY FUEL DOOR

BACKGROUND OF THE DISCLOSURE

This disclosure relates to a communication device, and more particularly to a communication device that provides information between a fuel supply device and a fuel cell vehicle.

Fuel cell vehicles are generally known in the art, and particularly relate to vehicles that generate driving power via an electrochemical reaction of a fuel gas with an oxidizing gas. By way of example only, one preferred fuel gas is hydrogen that is selectively combined with air to complete the electrochemical reaction of the fuel gas and supply desired driving power for the vehicle. An on-board fuel tank maintains the supply of fuel gas. The fuel tank must be periodically replenished or refueled and, unlike a typical gasoline refueling system, information relating to the fuel tank must be communicated to the fuel gas filling or refueling station in order to provide for safe and effective refueling of the on-board fuel tank.

Various data or information may be exchanged between the vehicle and the fuel gas filling station. For example, the volume, temperature, pressure, heat transfer characteristics, etc. of the fuel gas tank are representative parameters that may be monitored or stored, some of which may be conveyed to the fuel gas filling station during the refueling process. This data is typically stored in an electronic control unit (ECU) and upon connection between the refueling nozzle with the vehicle receptacle, a data transfer between the stored data and the fuel gas filling station is also completed. Oftentimes, these communication devices/ECUs have to access the main ECU of the vehicle to gather the information on tank system status such as temperature. However, it is common to shut off all power when the key is removed from the vehicle ignition. In other instances, the power is shut off after a predetermined time period measured from the time the key is removed from the vehicle ignition. In either instance, the power shut off can interfere with the transfer of data between the vehicle and the fuel gas filling station.

Consequently, a need exists for an alternative arrangement that provides for effective communication of data or information when a refueling station is most likely to require that information.

SUMMARY OF THE DISCLOSURE

A filling system for a fuel cell vehicle includes a receptacle on the vehicle configured to receive an associated fuel filler nozzle. A communication device is operatively associated with the receptacle and configured to at least transmit or receive information between the fuel cell vehicle and the associated fueling station and the communication device remains active as long as access to the receptacle is available.

The communication device preferably includes an auxiliary electronic control unit (ECU).

Preferably, a fuel door adjacent the receptacle allows selective access to the receptacle, and the communication device is active whenever the fuel door permits access to the receptacle.

The fuel door is movable between open and closed positions, and the communication device is operational whenever the fuel door is in the open position.

The communication device is operational irrespective of remaining operations of the vehicle, including being operational irrespective of a key being operatively received the vehicle.

A method of monitoring information during refueling of a fuel cell vehicle includes the steps of providing an access fuel door, activating an on-board communication device/auxiliary electronic control unit (ECU) when the fuel door is in an open position, and deactivating the ECU when the fuel door is in a closed position.

The ECU remains active as long as the fuel door is in the open position.

The ECU is active irrespective of whether a key is in the fuel cell vehicle.

The method further includes storing information relating to at least tank system status in the auxiliary ECU, and preferably the tank system status includes tank system temperature.

A primary benefit is the ability to convey information between the fueling station and the fuel cell vehicle when needed.

Another advantage relates to gathering information on tank system status, like temperature, without having to access the main ECU.

Still another benefit is associated with obtaining information from the communication device/auxiliary ECU even though all other devices in the fuel cell vehicle have been shut off, whether shut off upon removal of the key from the ignition or after certain period of time when the key is removed from the ignition.

Still other benefits and advantages of the present disclosure will become more apparent from reading and understanding the following detailed description.

DETAILED DESCRIPTION OF THE PREFERRED EMBODIMENT

Figure 1:
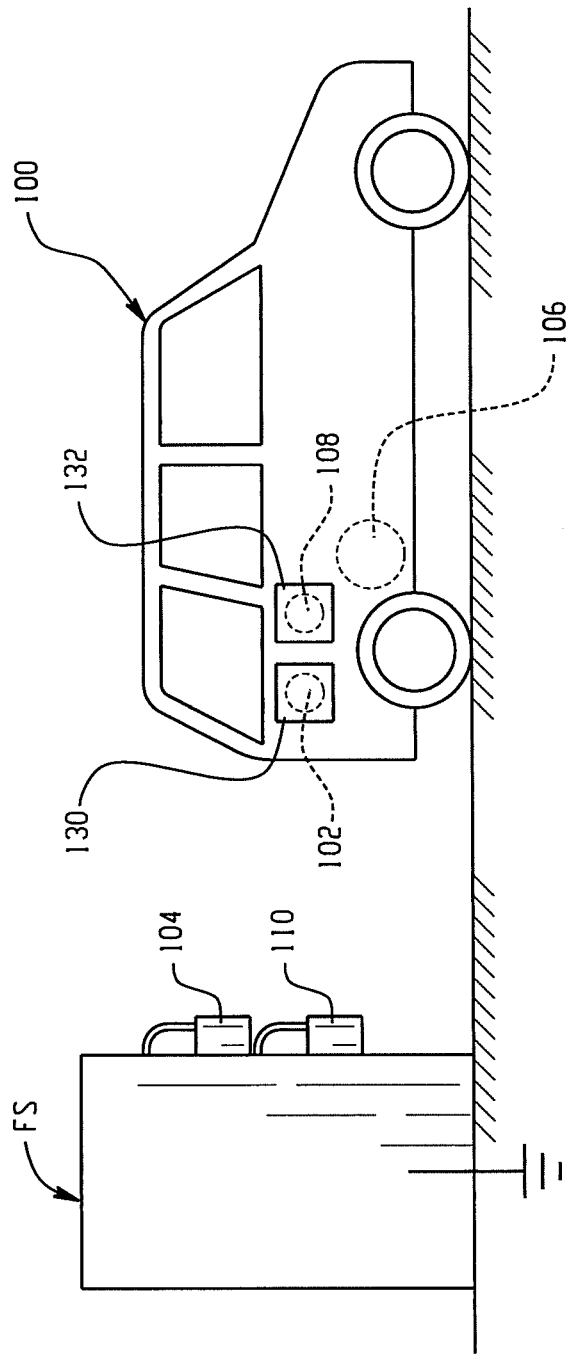
FIG. 1 shows a fuel cell powered vehicle and a fuel gas filling station.
Figure 2:
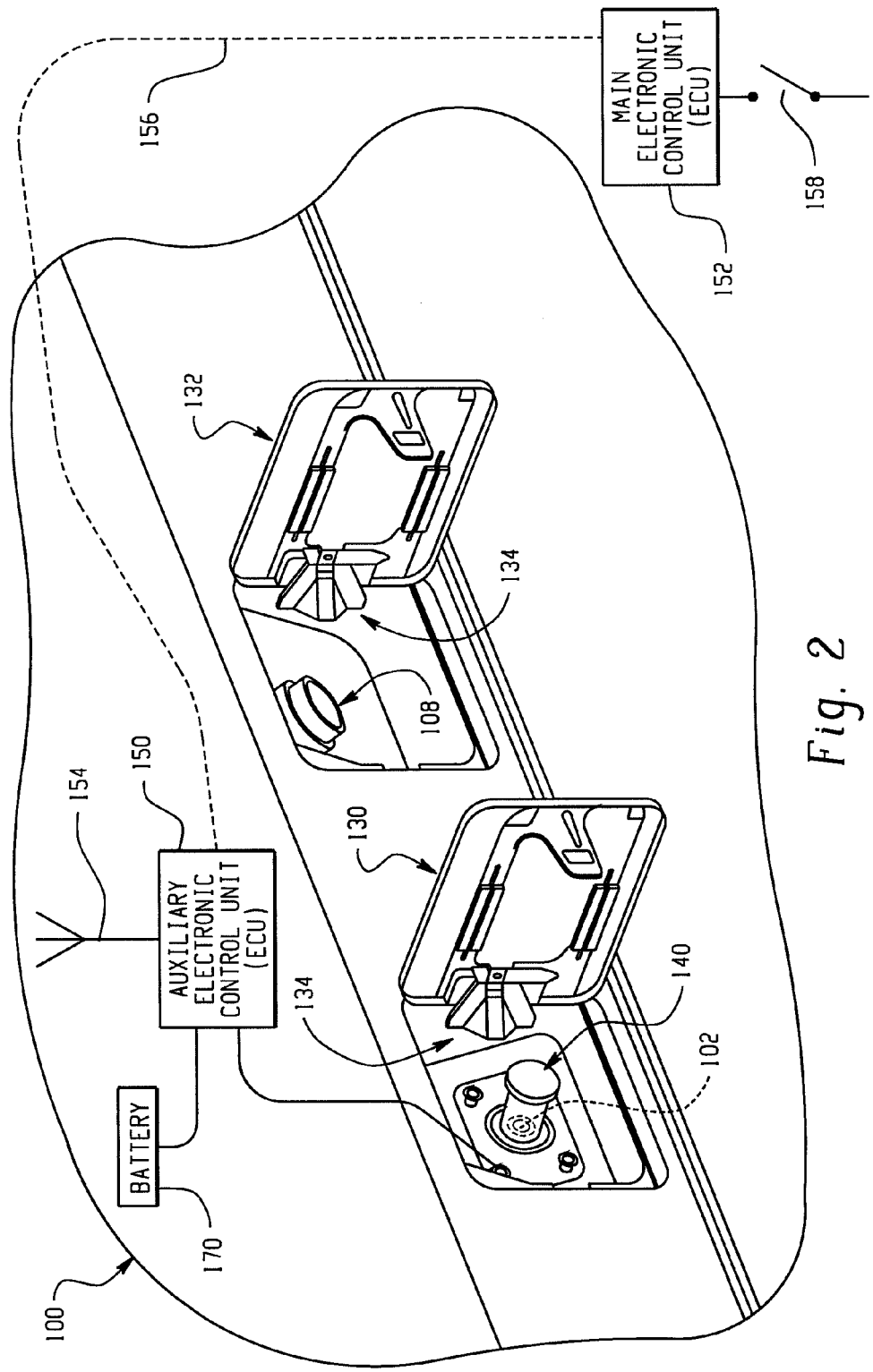
FIG. 2 is a perspective view showing a fuel gas filler receptacle and a ground connection section.
Figure 3:
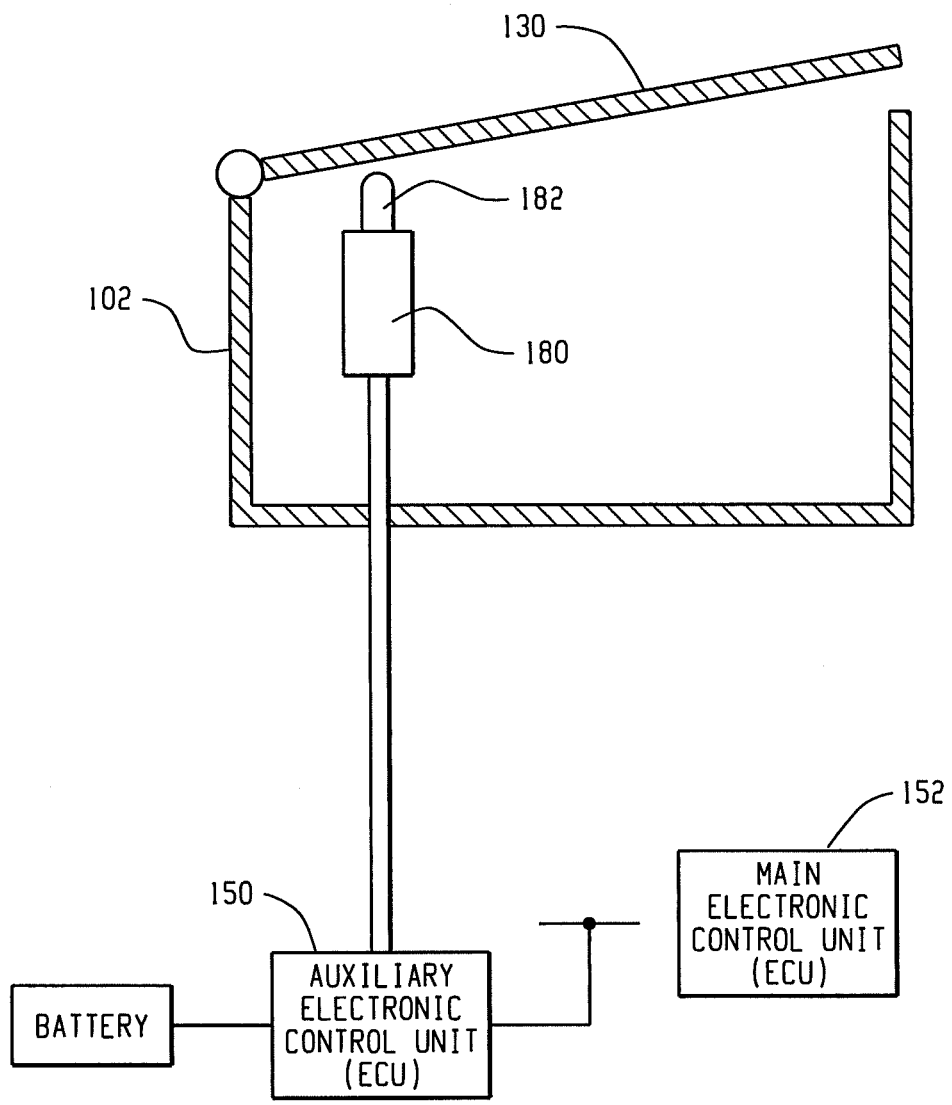
FIG. 3 is a schematic representation of a communication device associated with a fuel door.

A preferred embodiment of the present disclosure is shown in FIGS. 1-3. With initial reference to FIG. 1, a fuel cell vehicle 100 is shown at a fuel gas filling station FS. As indicated in the Background, the fuel cell vehicle 100 refers to any type of vehicle which receives its driving power through an electrochemical reaction between the fuel gas such as hydrogen with an oxidizing gas such as air. The particular details of such fuel cell vehicles are known in the art so that further discussion herein of the fuel cell vehicle structure and operation is deemed unnecessary to a complete understanding of the present disclosure. The fuel cell vehicle 100 includes a fuel gas filler receptacle 102 to which a fuel gas filler nozzle 104 of the associated refueling or filling station FS is selectively connected to refuel or provide a fuel gas such as hydrogen to an onboard fuel tank 106. The tank 106 stores the fuel gas supplied from the filling station FS via the filler nozzle 104. In some arrangements, a ground connection section 108 must be provided on the vehicle 100 for connection with a ground connection line 110 of the filling station. The ground connection dissipates static electrical charge via the ground connection line 110. In the embodiment illustrated in FIG. 1, the fuel gas filler nozzle 104 and the ground connection line 110 are shown as separate components for selective receipt in the associated fuel gas filler receptacle 102 and the ground connection section 108, respectively, of the fuel cell vehicle 100.

Each of the fuel gas filler receptacle 102 and the ground connection section 108 includes an access door 130, 132, respectively. More particularly, the respective doors 130, 132 are shown in FIG. 2 and each has a hinge 134 provided along one edge to allow the door to pivot between an open position (shown in FIG. 2) and a closed position (FIG. 1) to provide selective access to the gas filler receptacle or the ground connection section. Particular details of the ground connection section may be similar to those associated with the fuel gas filler receptacle, although the present disclosure will focus on those features of the fuel gas filler receptacle 102 as detailed below. Preferably, the fuel gas filler receptacle 102 is located adjacent a rear, side portion of the vehicle body, although other locations can be used without departing from the scope and intent of the present disclosure.

In addition to fuel door 130, a cap or cover 140 is typically provided to selectively close off access to the fuel gas filler receptacle 102. Once the vehicle user determines that additional fuel gas is required, the vehicle is moved adjacent to the filling station FS and the fuel door 130 is opened. The cap 140 is removed and the refueling nozzle 104 is received in the receptacle 102. In addition, information associated with the refueling process is monitored. One example of such data or information relates to temperature of the fuel tank 106. The information is stored in a communication device or auxiliary ECU 150, or alternatively is provided to the auxiliary ECU through the main ECU 152. The auxiliary ECU 150 is intended to communicate with the filling station to exchange (transmit or receive) data, typically from the fuel cell vehicle to the filling station, although data could also be received by the ECU from the filling station if so desired. Antenna 154 is representative of the communication capability of the communication device/auxiliary ECU 150. That is, a wired connection or wireless connection may be provided between the communication device/auxiliary ECU 150 with the filling station during the refueling process. Again, data may be received in the auxiliary ECU 150 either directly or indirectly, i.e. through line 156 that communicates with the main ECU 152. If the key is removed from the vehicle as represented by open switch 158 in FIG. 2, the main ECU and other electronic components of the vehicle will be shut off, or may be shut off after a predetermined time after the key has been removed. In either event, the auxiliary ECU is intended to still serve as a communication device and is therefore powered by the main vehicle battery or an alternative, auxiliary power device as represented by reference numeral 170.

It is not necessary that the communication device/auxiliary ECU be constantly powered. However, it is important that the auxiliary ECU be available to communicate data or information through connection 154 when refueling occurs. To address these situations, the present disclosure assures that the communication device/auxiliary ECU 150 is operational when refueling occurs. One preferred arrangement for assuring that the communication device/auxiliary device 150 operates when refueling occurs is to activate the communication device/auxiliary device when the fuel door 130 is open. As shown in FIGS. 2-3, a switch 180 is provided on the vehicle and powers the communication device 150 when the fuel door 130 is open. For example, a projecting finger 182 may be selectively biased outward so that when the door 130 is open, the finger is extended and thereby closes the switch to power the communication device/auxiliary ECU 150. Alternatively, when the fuel door 130 is closed, the projection finger 182 is depressed and overcomes the outward biasing force to open the switch.

In the closed fuel door position, power can still be provided to the auxiliary ECU either through another means or, for example, through the main ECU. However, if this alternative path for providing power to the auxiliary ECU is shut off, for example by removing the key or after a predetermined period when the key is removed from the ignition, power is still provided to the communication device/auxiliary device 150 via activation of the fuel door switch 180.

When the fuel door 130 is open, the communication device/auxiliary ECU is activated. Upon closing the fuel door, the device is shut off. Further, the communication device works regardless of whether the key is in the vehicle or not. By activating the communication device only when the fuel door is open, communication of information is allowed only when a refueling station is most likely to request the information. The device 150 will not time out, since the communication device is intended to stay active as long as the fuel door 130 is open.

It will be recognized that alternative switch arrangements or other ways to power the communication device/auxiliary ECU 150 can be provided. Likewise, different types of information can be transmitted and/or received between the vehicle and the filling station. For example, in another embodiment of the present disclosure, a temperature measurement device may be included to measure temperature of the fuel (e.g. hydrogen gas). The typical manner of monitoring vehicle filling is to measure tank pressure. Here, however, a temperature measurement device is separately powered from the vehicle ECU. Such a temperature measurement device could be a thermocouple with a wireless communication device, an RFID (radio frequency identification device) with a thermocouple input, or another temperature measurement device.

When using the temperature measurement device, the tank temperature and not the tank pressure is communicated to the hydrogen filling station FS during vehicle filling. Other parameters may also be communicated, such as heat transfer data, tank volume, etc. If desired, the station can be designed to dynamically measure the pressure of the tank.

Figure 4:
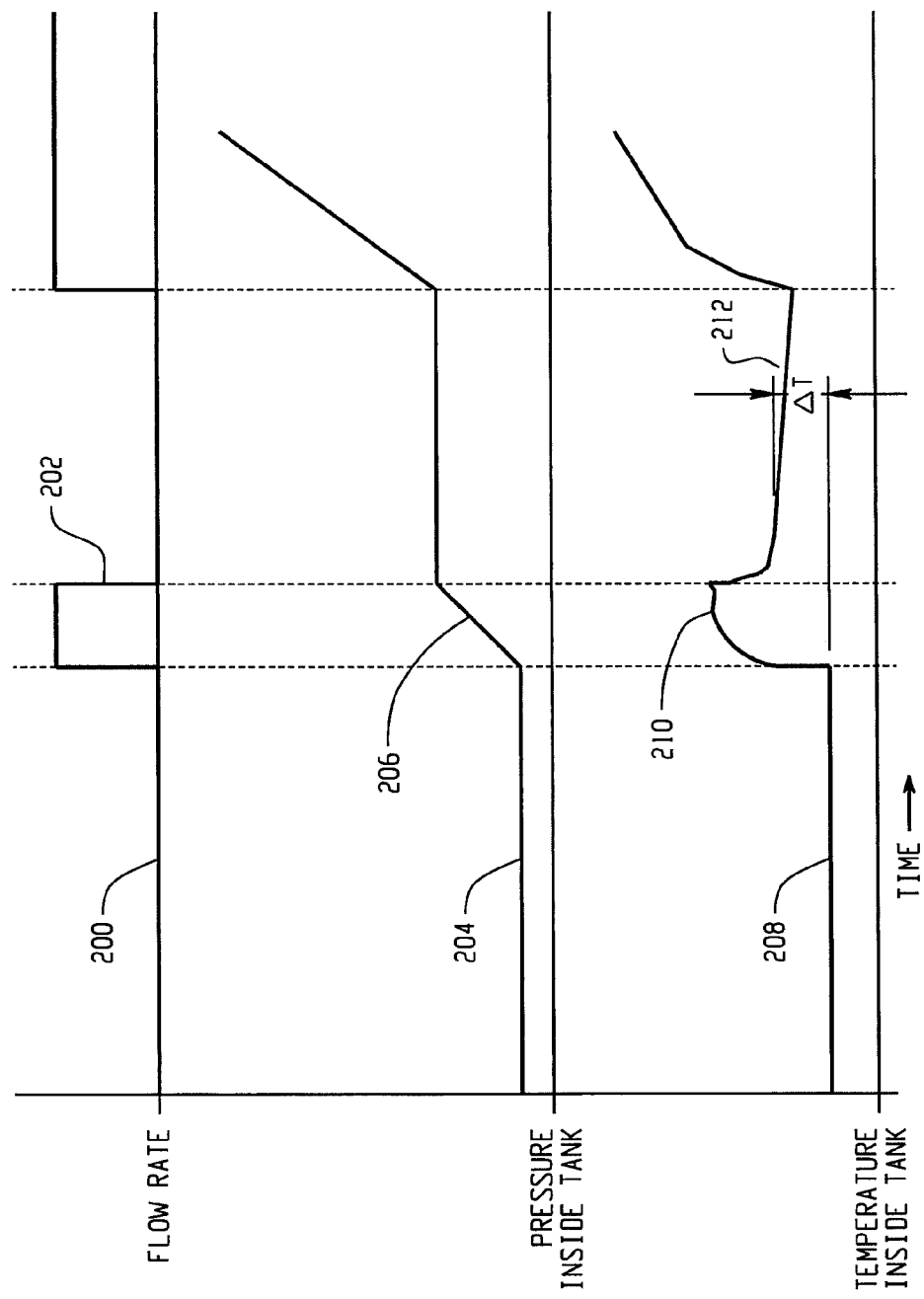
FIG. 4 is a graphical representation of one manner of confirming that a filling station is receiving data from the tank being filled.

Using a wireless data transmission encounters the attendant risk of reading data from an incorrect vehicle. Therefore, a means of positively identifying the tank for which the filling station FS has received temperature information is necessary. The filling station must confirm that the temperature information it receives belongs to the same tank being filled. One means of accomplishing this is to provide an abbreviated flow of fuel into the tank from the filling station (FIG. 4). This is represented in data plot 200 by an increase in flow identified by reference numeral 202. The filling station monitors the pressure inside the tank as represented in data plot 204 and specifically measures the rising pressure 206 associated with that abbreviated flow of gas. With the introduction of fuel into the tank from the filling station, there is a resulting rise in temperature of the receiving tank which is represented in data plot 208 and the specific corresponding rise in temperature is identified by reference numeral 210. The filling station receives the temperature information, e.g., wirelessly, and compares the temperature change ($\Delta T$) of the gas before and after the introduction of the fuel (see reference numeral 212). If the temperature of the gas has risen more than a predetermined amount, this serves as positive confirmation that the flow of fuel was received by the same tank from which the filling station is measuring a pressure rise. The process could be repeated for additional confirmation. This provides one manner of positively identifying that the tank that is connected with the filling station is the same as the tank for which data has been communicated to the filling station. Of course, other similar arrangements could be used without departing from the scope and intent of the present disclosure.

The disclosure has been described with reference to preferred embodiment. Obviously, modifications and alterations will occur to others upon reading and understanding the preceding detailed description. It is intended that the disclosure be construed as including all such modifications and alterations.

We claim:

1. A filling system for a fuel cell vehicle comprising:
    a receptacle on the vehicle configured to receive an associated fuel filler nozzle of an associated filling system;
    a communication device operatively associated with the receptacle that is configured to at least transmit or receive information between the fuel cell vehicle and the associated filling system; and
    a device that provides an abbreviated fuel flow into a fuel tank of the vehicle, and detects at least one of a corresponding rise in pressure and temperature in the fuel tank to confirm the accurate identity of the fuel cell vehicle being filled.

2. The filling system of claim 1 wherein the communication device includes an auxiliary electronic control unit (ECU).

3. The filling system of claim 1 further comprising a fuel door adjacent the receptacle and allowing selective access to the receptacle.

4. The filling system of claim 3 wherein the communication device is active whenever the fuel door operatively permits access to the receptacle.

5. The filling system of claim 4 wherein the fuel door is movable between at least open and closed positions, and wherein the communication device is operational when the fuel door is in the open position.

6. The filling system of claim 5 wherein the communication device is operational irrespective of remaining operations of the vehicle.

7. The filling system of claim 6 wherein the communication device is operational irrespective of a key being operatively associated with the vehicle.

8. The filling system of claim 5 wherein the communication device is non-operational when the fuel door is in the closed position.

9. The filing system of claim 1 further comprising a wireless communication device for transmitting fuel tank temperature data, and confirming that the fuel tank temperature is associated with the fuel tank being filled.

10. A filling system for a fuel cell vehicle comprising:
    a receptacle on the vehicle configured to receive an associated fuel filler nozzle of an associated filling system;
    a fuel door adjacent the receptacle allowing selective access to the receptacle;
    a communication device operatively associated with the receptacle that is configured to at least transmit or receive information between the fuel cell vehicle and the associated filling system when the fuel door is in the open position; and
    a device that provides an abbreviated fuel flow into a fuel tank of the vehicle, and detects at least one of a corresponding rise in pressure and temperature in the fuel tank to confirm the accurate identity of the fuel cell vehicle being filled.

11. The filling system of claim 10 wherein the vehicle includes a primary electronic control unit (ECU) and the communication device is an auxiliary ECU.

12. The filling system of claim 10 wherein the communication device remains active as long as access to the receptacle is available.

13. A method of monitoring information during refueling of a fuel cell vehicle comprising:
    providing an access fuel door;
    activating an on-board auxiliary electronic control unit (ECU) when the fuel door is in an open position;
    deactivating the ECU when the fuel door is in a closed position;
    providing an abbreviated fuel flow into a fuel tank of the vehicle; and
    detecting at least one of a corresponding rise in pressure and temperature in the fuel tank to confirm the accurate identity of the fuel cell vehicle being filled.

14. The method of claim 13 wherein the ECU remains active as long as the fuel door is in the open position.

15. The method of claim 13 wherein the ECU is active irrespective of whether a key is in the vehicle.

16. The method of claim 13 wherein the ECU is only activated when the fuel door is open.

17. The method of claim 13 further comprising storing information relating to at least tank system status in the auxiliary ECU.

18. The method of claim 17 wherein the storing step includes storing tank system temperature in the auxiliary ECU.

* * * * *